(No Model.) 3 Sheets—Sheet 3.
T. McADOO.
GAS ENGINE.
No. 253,406. Patented Feb. 7, 1882.
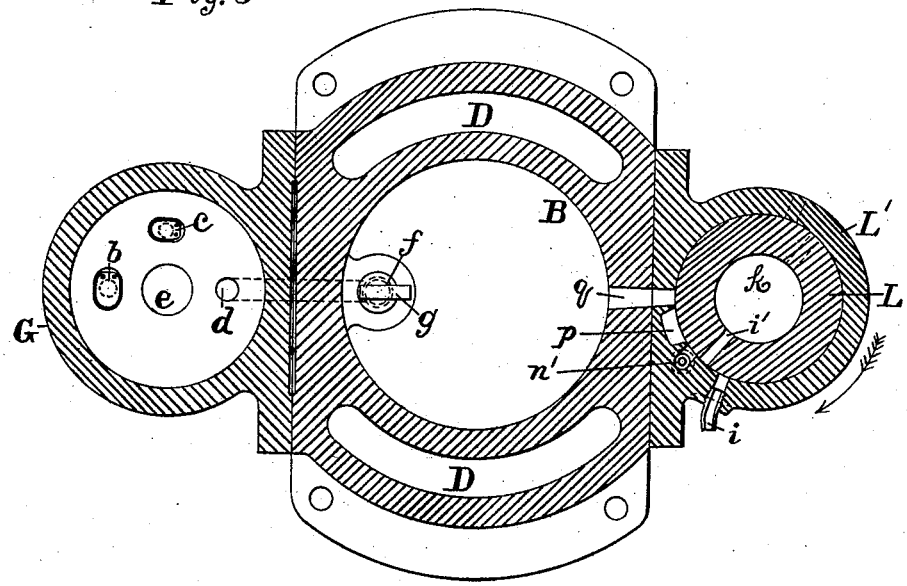
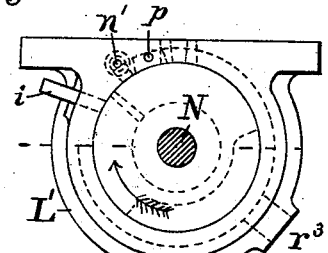
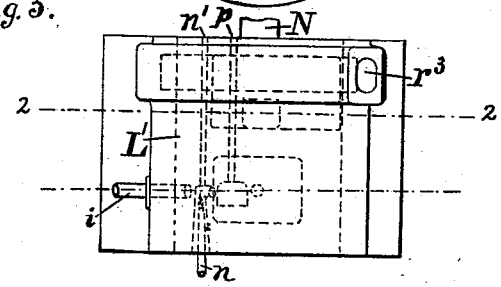
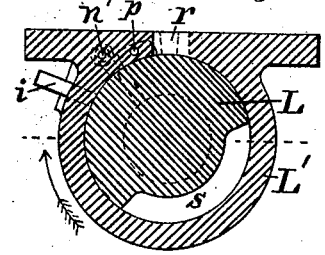
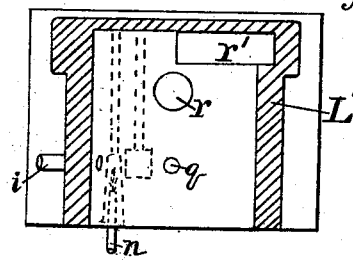
WITNESSES:
A. Cooper
A. E. Eader
INVENTOR:
Thomas McAdoo
By Chas. B. Mann
ATTORNEY

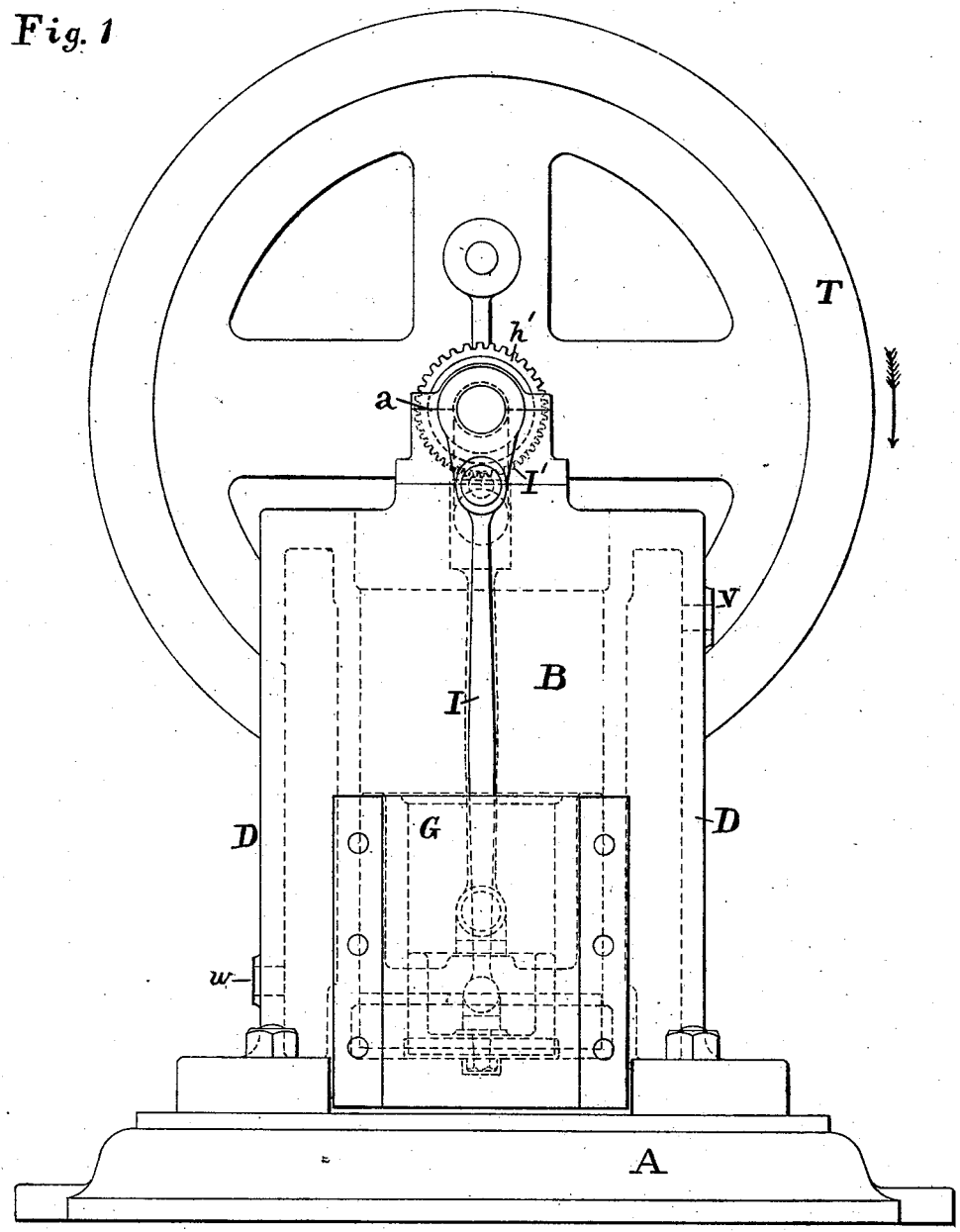

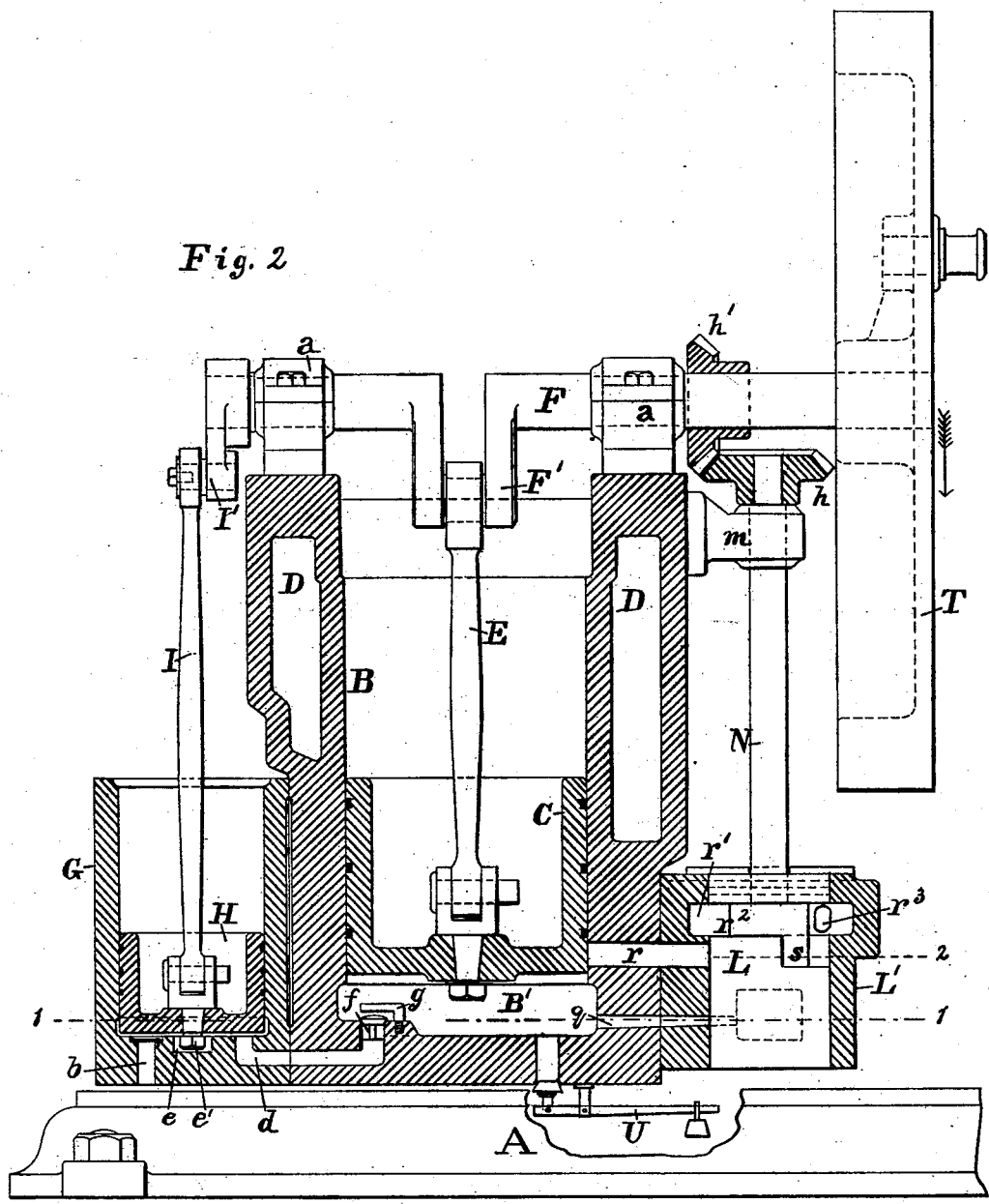

UNITED STATES PATENT OFFICE.

THOMAS McADOO, OF BALTIMORE, MARYLAND.

GAS-ENGINE.

SPECIFICATION forming part of Letters Patent No. 253,406, dated February 7, 1882.

Application filed November 5, 1881. (No model.)

*To all whom it may concern:*

Be it known that I, THOMAS MCADOO, a citizen of the United States of America, residing at Baltimore, in the county of Baltimore and State of Maryland, have invented certain new and useful Improvements in Gas-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to gas-motor engines of that class in which a mixture of air and gas is exploded within a cylinder, causing the piston to make its stroke.

The construction of an engine embodying my improvements will be described and the operation of the same explained, and the features constituting the invention will be designated in the claims.

In the drawings hereto annexed, Figure 1 is a side elevation of my engine. Fig. 2 is a vertical section of the engine in a direction transverse to that shown in Fig. 1. Fig. 3 is a horizontal section of the engine parts on line 1 1, shown in Fig. 2. Fig. 4 is a top view of the valve-case. Fig. 5 is a side view of the same. Fig. 6 is a horizontal section of the valve on line 2 2, shown in Fig. 5. Fig. 7 is a vertical section of the valve-case on the line drawn through Figs. 4 and 6, showing an inside view.

The letter A designates the bed of the engine; B, the main cylinder; C, its piston; D, the water-jacket around the cylinder; E, the piston-rod; F, the main shaft, and F' the crank to which the piston-rod connects. The main shaft has its bearings in the boxes $a$, of ordinary construction, which are supported on the cylinder.

At one side of the main cylinder is a smaller cylinder, G, which has a piston, H, and a rod, I, which connects with a crank, I', on the end of the main shaft. This small cylinder is for the purpose of mixing air and gas and compressing the mixture and forcing it under pressure into the main cylinder. Two valves are arranged in the bottom of this cylinder. The one marked $b$ is for the admission of air, and the one denoted by $c$ is for the admission of gas. These are ordinary flap-valves, which open as the piston H goes up and close as it comes down. A duct, $d$, opening out of the bottom of the compressing-cylinder leads to the enlarged cavity B' at the bottom of the main cylinder. In the center of the bottom of the compressing-cylinder is a cavity, $e$, of size to receive the nut $c'$ on the inner side of the piston-head H. A valve, $f$, is provided to open and close the discharging end of the duct. This valve, which may be of any suitable construction, opens as the mixture of air and gas is forced through by the compressor, and closes when the pressure caused thereby ceases. In the present instance a bar, $g$, is arranged just above the valve $f$, and serves as a stop to prevent it from opening too far.

A rotary valve, L, is placed on the side of the main cylinder diametrically opposite the compressor. A shaft, N, is attached to this valve, and its upper end has a bearing, $m$, attached to the casing of the water-jacket, and receives its motion from the main shaft through the medium of the bevel-gears $h$ and $h'$. The casing L', which surrounds the valve, has a pipe, $i$, which enters through the side, and by which gas is supplied to fill the interior chamber, $k$, in the valve. The gas from the pipe $i$ reaches this chamber through the duct $i'$ in the valve. The arrow indicates the direction in which the valve rotates. After the interior chamber has received a supply of gas the duct $i'$ is brought in contact with the constantly-burning jet $n$, which occupies a vertical aperture, $n'$, extending through the valve-casing. The jet ignites the gas in the duct, and the latter is then brought opposite the air-inlet $p$, which extends from the top downward. By the air thus supplied the combustion of the gas is maintained. The further rotation of the valve brings the duct $i'$, with the gas in it in a state of ignition, opposite the duct $q$, which leads to the enlarged cavity B' in the bottom of the main cylinder. As this enlarged cavity contains a mixture of air and gas under pressure, the instant the ignited gas in duct $i'$ comes opposite the duct $q$ an explosion ensues, whereby the piston is forced up. An exhaust-duct, $r$, leads from the main cylinder near its bottom.

In the cylindrical valve-casing, at a point just above the exhaust-duct, which leads from the main cylinder, is a groove, $r'$, which extends about two-thirds of the distance around the casing, commencing near or just above the exhaust-duct $r$, and the rotary valve has an annular groove, $r^2$, which coincides with the groove in the casing. On one side of the valve is a cavity, $s$, which connects with the annular groove $r^2$, the cavity thus constituting practically an enlargement of the groove on its lower side, which extends about one-third the distance around the valve, as shown in Fig. 6. The outlet or discharge $r^3$ for the exhaust is located in the side of the casing. When the piston of the main cylinder is two-thirds up on its stroke the cavity $s$ in the valve is in coincidence with the exhaust-duct $r$, and the exhaust then begins to take place. The valve remains open—or, in other words, the cavity continues in coincidence with the duct $r$—until the piston completes its stroke and returns one-third down. At this point the compressor-piston H has begun to come down and to press air and gas into the main cylinder, and this compression continues until the pistons are down.

A fly-wheel, T, is mounted on the main shaft.

The rotary valve and its seat, consisting of the casing L', may each be made of a tapering form, in order thereby to take up the wear and always fit tight.

A safety-valve, U, is attached to the main cylinder to prevent rupture in case of any derangement of the working parts. This valve may be of any suitable construction.

The water-jacket pipe-connections are not shown; but the supply of water enters at V and is discharged at $w$.

An engine constructed as herein shown and described, or in which the parts shall be combined and arranged to operate substantially as described, will occupy but small floor-space, the cylinders being vertical, and will utilize a greater percentage of the power of the expansion of the air and gas, and therefore will be operated economically.

Having described my invention, I claim and desire to secure by Letters Patent of the United States—

1. In a gas-motor engine, the combination of a main cylinder having the driving-piston and provided at its closed end with a cavity, a separate air-and-gas-compressing cylinder provided in the closed head with two independent valves, one serving to admit air and the other to admit gas, and a duct leading from the compressing-cylinder into the cavity in the main cylinder, as set forth.

2. In a gas-motor engine, the combination of a vertical main cylinder having the driving-piston, a vertical air-and-gas-mixing cylinder having a compressing-piston, a duct to connect the two cylinders, a rotary igniting-valve turning in a horizontal plane, and a crank-shaft mounted above the whole and directly connected with the two pistons and the rotary valve, as set forth.

3. In a gas-motor engine, a main cylinder having the driving-piston and provided with an exhaust-duct, $r$, and an ignition-duct, $q$, in combination with a rotary valve provided with means to effect the explosion in the main cylinder through the ignition-duct, and also provided with means to allow the exhaust from the main cylinder to escape, as set forth.

4. In a gas-motor engine, a main cylinder having the driving-piston and provided with an exhaust-duct, $r$, in combination with a cylindrical valve-case, L', having an inlet, $i$, for gas, a jet, $n$, for igniting the gas, an inlet, $p$, for air to maintain the ignition of the gas, an ignition-duct, $q$, communicating with the main cylinder, an outlet, $r^3$, for the escape of the exhaust, and a valve, L, to rotate within the cylindrical case, having a central interior gas-chamber, $k$, provided with an igniting-duct, $i'$, to coincide with the inlet $i$ and duct $q$ in the case, and also provided with a groove, $r^2$, to connect with the exhaust-outlet $r^3$, and a cavity on one side of the groove to coincide with the exhaust-duct $r$, as set forth.

In testimony whereof I affix my signature in presence of two witnesses.

THOMAS McADOO.

Witnesses:
  JNO. T. MADDOX,
  CHAS. B. MANN.